United States Patent
Olmedo

(10) Patent No.: US 6,174,170 B1
(45) Date of Patent: Jan. 16, 2001

(54) DISPLAY OF TEXT SYMBOLS ASSOCIATED WITH AUDIO DATA REPRODUCIBLE FROM A RECORDING DISC

(75) Inventor: Hernan Patricio Silva Olmedo, Santiago (CL)

(73) Assignees: Sony Corporation, Tokyo (JP); Sony Electronics, Inc., Park Ridge, NJ (US)

( * ) Notice: Under 35 U.S.C. 154(b), the term of this patent shall be extended for 0 days.

(21) Appl. No.: 08/955,180

(22) Filed: Oct. 21, 1997

(51) Int. Cl.$^7$ ........................................ G09B 5/00
(52) U.S. Cl. .................. 434/307 A; 434/307 R; 434/308; 434/318
(58) Field of Search ................ 434/307 A, 307 R, 434/308, 318

(56) References Cited

U.S. PATENT DOCUMENTS

| | | | |
|---|---|---|---|
| 5,131,311 | * | 7/1992 | Murakami et al. ........... 434/307 A X |
| 5,194,683 | * | 3/1993 | Tsumura et al. ................ 434/307 A |
| 5,319,452 | * | 6/1994 | Funahashi .................... 434/307 A X |
| 5,321,200 | * | 6/1994 | Yamamoto ...................... 434/307 A |
| 5,453,570 | * | 9/1995 | Umeda et al. ................ 434/307 A X |
| 5,454,723 | * | 10/1995 | Horii ............................. 434/307 R X |
| 5,499,921 | * | 3/1996 | Sone ............................ 434/307 A X |
| 5,499,922 | * | 3/1996 | Umeda et al. ................... 434/307 A |
| 5,546,191 | * | 8/1996 | Hibi et al. ........................ 348/564 X |
| 5,574,239 | * | 11/1996 | Kang et al. .................. 434/307 A X |
| 5,588,842 | * | 12/1996 | Nishimura et al. ............. 434/307 A |
| 5,609,487 | * | 3/1997 | Setlabudi et al. ................ 434/307 A |
| 5,641,927 | * | 6/1997 | Pawate et al. ................ 434/307 A X |
| 5,648,628 | * | 7/1997 | Ng et al. ....................... 434/307 A X |
| 5,649,234 | * | 7/1997 | Klappert ...................... 434/307 A X |
| 5,694,381 | * | 12/1997 | Sako ................................... 369/58 X |
| 5,777,252 | * | 7/1998 | Tada ............................. 434/307 A X |

* cited by examiner

Primary Examiner—Michael O'Neill
Assistant Examiner—Chanda Harris
(74) Attorney, Agent, or Firm—Frommer Lawrence & Haug, LLP.; William S. Frommer; Dexter T. Chang

(57) ABSTRACT

Text symbols associated with audio data reproducible from a recording disc are displayed by downloading previously stored groups of text characters, each group representing a respective phrase of text. Each text character includes start/end bits to indicate the start and end of respective phrases as well as symbol identifying bits to identify a respective text symbol in the phrase. The start/end and symbol identifying bits of a downloaded group of text characters are used to assemble a phrase of text symbols; and the assembled phrase is displayed.

31 Claims, 6 Drawing Sheets

DISPLAY OF TEXT SYMBOLS ASSOCIATED WITH AUDIO DATA REPRODUCIBLE FROM A RECORDING DISC

BACKGROUND OF THE INVENTION

This invention relates to displaying text symbols and, more particularly, to the display of text symbols that are associated with audio data reproducible from a recording disc.

There are many applications in which it is desirable to reproduce audio information from a prerecorded disc, such as a compact disc (CD), a mini-disc (MD) or the like, and to display text information, notably text symbols, associated with that audio information. For example, in the home entertainment environment, it is desirable to display the words of a song that has been prerecorded on a disc in order to enable the user to sing that song. This application is known as "karaoke"; and karaoke systems are commercially available wherein the user's voice is mixed with the prerecorded musical accompaniment, resulting in enhanced performance.

In other applications, it is desirable to display text symbols associated with information stored on a CD-ROM, such as stored audio information, stored graphics information, and the like. The text symbols may consist of subtitle information, instructions, summaries, translations into different languages, etc.

Information recorded on compact discs, whether it is audio information recorded on a CD or other information recorded on a CD-ROM, typically is recorded in a pre-established format that is not particularly conducive to the display of text symbols. For example, in the environment of an audio CD, digital audio data is recorded in frames with each frame containing 588 bits of synchronizing, control and audio information. This format is illustrated in FIG. 1, with the beginning of a frame being denoted by sync frame data followed by sync control data followed by multiplexed left-channel and right-channel data. The left-channel data includes two 8-bit bytes which form a sample, with three left-channel and three right-channel samples being multiplexed in the first half of the frame; and three left-channel and three right-channel samples being multiplexed in the second half of the frame. An error correcting code, such as CIRC is used to error-correct the six multiplexed samples in the first half of the frame and another CIRC code is used to error-correct the six multiplexed samples in the second half of the frame. A block of audio data is formed of ninety-eight such frames.

The one byte of sync control data C in each frame is thought of as containing bits P, Q, R, S, T, U, V and W; and these bits also are known as channels. Bit, or channel, Q is used in frame 1 and frame 2 of a block to indicate the beginning of that block: that is, to indicate that this is a new block of information. At present, the remaining bits, or channels, other than bit or channel Q, in the sync control data C are not used for any other purpose.

Heretofore, there has been no commercial effort to include in a block of audio data stored on a recording disc information representing text symbols which, when reproduced from the disc along with the audio information can be displayed.

OBJECTS OF THE INVENTION

Therefore, it is an object of the present invention to provide a technique whereby text symbols associated with audio data stored on a recording disc may be displayed.

Another object of this invention is to provide such a technique in which the recording disc stores both the text information to be displayed and the audio information to be heard.

A further object of this invention is to provide such a technique in which the text information is stored on a medium that is separate and apart from the recording disc on which the audio information is stored.

An additional and specific object of this invention is to provide a karaoke disc, which may be in either CD or MD format, that can be played by a conventional CD or MD player and provide a text display.

Various other objects, advantages and features of the present invention will become clear from the description set out below; and the novel features will be particularly pointed out in the claims.

SUMMARY OF THE INVENTION

In accordance with this invention, a technique is provided for displaying text symbols that are associated with audio data reproducible from a recording disc, such as a compact disc (CD), a mini-disc (MD), or the like. As used herein, the expression "audio data" is intended to refer to audio information recorded on such a disc, as well as audio and/or graphical information recorded on a CD-ROM. For convenience, however, "audio data" refers to both types of information.

Groups of text characters representing respective phrases of text are downloaded. Each text character includes start/end bits to indicate the start and end of a phrase as well as symbol identifying bits to identify a respective text symbol in the phrase. The downloaded text characters are assembled into a phrase, depending upon the start/end bits of the text characters; and the assembled phrase is displayed. As one feature of this invention, a read only memory (ROM) stores each text symbol to be displayed and the symbol identifying bits of each downloaded text character are used to address the ROM and read therefrom the stored text symbol corresponding to the symbol identifying bits.

In one aspect of this invention, the groups of text characters are stored on the same recording disc as the audio data; and in another aspect, the text data is stored on a different recording medium. For example, the audio data may be stored on a CD and the text characters may be stored on a separate CD or on a storage cartridge.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF CERTAIN PREFERRED EMBODIMENTS

Figure 1:
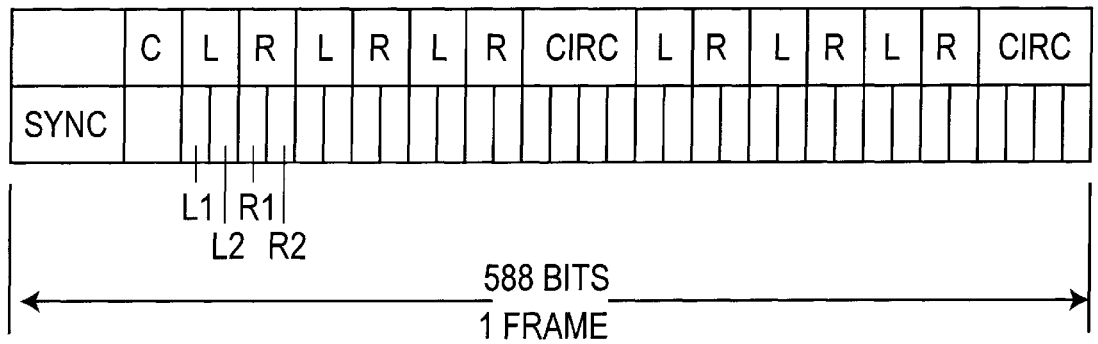
FIG. 1 is a schematic representation of a frame of audio data recorded on a CD or MD.
Figure 2:
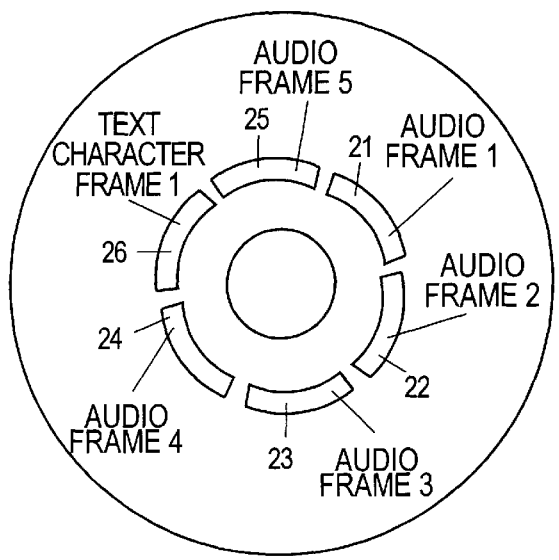
FIG. 2 is a schematic representation of a recording disc on which both audio data and text characters are stored.

Referring now to the drawings, the present invention will best be appreciated first by describing briefly the manner in which the frames of audio data shown in FIG. 1 are arranged on a CD or MD. FIG. 2 schematically represents a typical recording disc 20, which may be a CD or MD, having successive frames recorded in a circular track. For example, assuming a block of audio data is formed of 98 frames, with each frame of audio data being depicted in FIG. 1, it is seen from FIG. 2 that audio frame #1 is recorded as segment 21, audio frame #2 is recorded as segment 22, and so on. For convenience, only five frames of audio data are illustrated; and these five frames are recorded as segments 21, 22, 23, 24 and 25, respectively.

In the embodiment shown in FIG. 2, several text characters are recorded in a segment 26 that is inserted into the block in which the frames of audio data are included. To distinguish a frame of audio data from a frame of text characters, a frame of audio data is referred to as an audio frame and the frame of text characters is referred to as a text character frame. The text character frame exhibits the same format as the audio frame, as is apparent by comparing the schematic representation of a text character frame shown in FIG. 3 with the schematic representation of the audio frame shown in FIG. 1. Like the audio frame, the text character frame is formed of 588 bits and includes frame sync information "SYNC", sync control information "C" and error correcting code data "CIRC". The clear difference between the text character frame shown in FIG. 3 and the audio frame shown in FIG. 1 is that the text character frame does not include left-channel and right-channel data. Rather, the two bytes of data which otherwise would be included in, for example, a left-channel sample L in the audio frame is replaced by two bytes of text characters. That is, bytes L1 and L2, which constitute the first left-channel sample shown in FIG. 1, are replaced by text character #1 and text character #2, respectively, in FIG. 3. Similarly, bytes R1 and R2, which constitute the first right-channel sample shown in FIG. 1, are replaced by text character #3 and text character #4, respectively, in FIG. 3. It is seen, then, that by replacing the left-channel and right-channel audio samples with text character bytes, 24 text characters may be included in a text character frame which, consistent with the present invention, is of the same size and format as an audio frame. Stated otherwise, text character frame #1, recorded as segment 26 in FIG. 2, and schematically illustrated in FIG. 3, exhibits the same structure as audio frame 1, 2, . . . etc., shown in FIG. 1.

Since the text character frame and the audio frame admit of the same structure and format, the usual pick-up and processing electronics normally used to reproduce the audio information from the CD or MD can be used without modification to recover, or download, the text characters stored as the text character frames on the CD or MD. Of course, the text characters must be distinguished from the audio information; and in the preferred embodiment shown in FIG. 3, the contents of the synchronizing frame sync data "SYNC" included in a text character frame are different from the contents of the frame sync data "SYNC" included in an audio frame. Typically, the frame sync data exhibits a 1/0 pattern of relatively low frequency that is readily detected; and a relatively slight modification of this low frequency pattern may be used to distinguish the frame sync data in the text character frame from the frame sync data in the audio frame. For example, this pattern in the audio frame may be formed of eight successive 1's followed by eight 0's; whereas this low frequency pattern in the text character frame may be formed of six 1's followed by six 0's. Other low frequency bit patterns may be used to identify the frame sync data.

In the present embodiment, one text character frame includes 24 8-bit text characters. The error correcting code CIRC is readily adapted to correct errors that may be present in twelve text characters; and for this purpose, the 24 text characters are separated into two halves with each half (i.e. each set of 12 text characters) being associated with a respective CIRC code.

Figure 4:
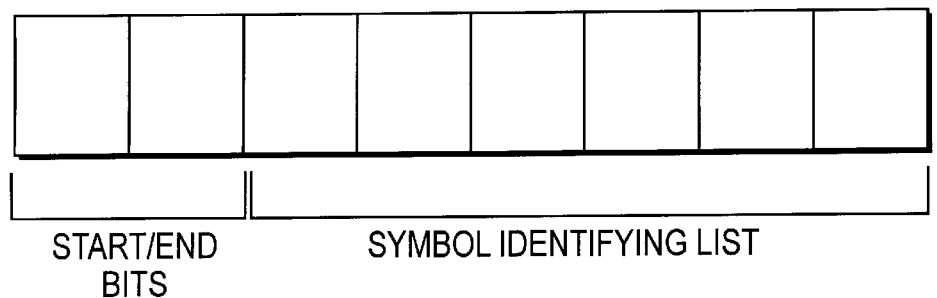
FIG. 4 schematically represents a text character.

FIG. 4 schematically represents the structure of a text character byte. The first two bits of the text character byte comprise start/end bits which indicate whether the text character that includes these bits is the first character in a phrase, the last character in the phrase or an intermediary character in the phrase. In one embodiment, a "phrase" may be sought of as a line of text formed of a number of words. On average, the total number of "characters" included in the words which make up a "phrase" is 40 characters. It will be appreciated that a "character" is a letter (a, b, c, . . . y, z) or a "space" between adjacent words. In the environment of karaoke, a typical phrase will contain no more than 40 characters (including all letters and spaces between adjacent words); and one example of a typical phrase is: "Oh the shark has . . . " which contains 4 words, separated by 3 "spaces" with a total of 16 characters. Each letter or space is referred to as a text symbol; and the six bits of lesser significance in the text character of FIG. 4 are referred to as the symbol identifying bits which identify the specific symbol represented by the text character. Using the afore-quoted phrase as an example, the first symbol "O" is represented by the text character shown in FIG. 4, with the start/end bits indicating that this text symbol is the start of the phrase and with the symbol identifying bits identifying this symbol as the letter "O". For example, the start/end bits representing the first symbol of the phrase may be "01" and the symbol identifying bits may be ASCII code bits.

The next text symbol in the aforequoted phrase may be represented as the text character whose start/end bits are "00" to indicate an intermediary text symbol, and whose symbol identifying bits may be the ASCII code identifying the letter "h". The next text character is the space between the words "Oh" and "the" and may be represented by the text character whose start/end bits are "11" to indicate that this text symbol is a "space" between words, and whose symbol identifying bits are the ASCII code representing a space. Then, the next text character contains the start/end bits "00", representing an intermediary character in the phrase; and the symbol identifying bits which identify the letter "t". It is appreciated that the remaining text characters identify the corresponding text symbols in the aforequoted phrase; with the last text character of this phrase having the start/end bits "10", which represent the last text symbol in the phrase, and having the symbol identifying bits which identify the text symbol "s".

In the foregoing, the symbol identifying bits have been described as ASCII characters. Preferably, however, the symbol identifying bits are not ASCII characters but, rather, are bits which are used as address bits to address a read only memory (ROM) in which are stored all of the codes needed to represent all of the text symbols that will be displayed. By adopting this preferred technique, the 6 symbol identifying bits can be used to address 64 different locations in the ROM, thus permitting 64 different text symbols to be stored in the ROM, read out therefrom and displayed. This provides more than adequate capacity to display karaoke text symbols as well as other text symbols that may be used with information stored on other recording discs, such as CD-ROMs.

As described herein, each phrase contains no more than 40 text symbols. Typically, an average song contains far less than 40 phrases. If, then, it is assumed that a song contains no more than 40 characters/phrase×40 phrases/song, then for purposes of karaoke, the expected number of text character frames that are to be recorded on disc 20 (FIG. 2) must be sufficient to accommodate 1600 characters. Since a text character frame stores up to 24 text characters, disc 20 should have recorded thereon up to 67 text character frames. Preferably, these 67 text character frames should be evenly distributed among the audio frames that are included in a particular song. FIG. 2 illustrates one text character frame that is multiplexed with five audio frames; and it will be appreciated that this multiplexing scheme or other desirable multiplexing schemes may be used to distribute the text character frames throughout the audio frames. Such distribution is preferred so that the disc player with which disc 20 is used will reproduce and display the text characters associated with a portion of a pre-recorded song as that song is reproduced. Consequently, the phrase will be displayed to the user just prior to the time that such phrase is to be sung. Stated otherwise, the text character frames are multiplexed with the audio frames so that, upon playing back the audio and text character frames, the text symbols associated with the audio data are displayed prior to the reproduction of that audio data.

Preferably, all of the text symbols included in a phrase should be displayed concurrently. As will be recognized, the start/end bits define a phrase and, thus, permit the entire phrase to be displayed at one time. In the foregoing description, it has been assumed that a phrase contains a maximum of forty text symbols. A typical display, such as an LED display, an LCD display, a video monitor, or the like, normally has a 40-symbol per line capacity. If, however, the display device exhibits a lesser capacity such that the device cannot display an entire phrase at one time (e.g., substantially less than forty symbols), the particular content of the start/end bits may be used to control that display. For example, if the phrase contains forty symbols but the display device is capable of displaying only twenty symbols at one time, the fact that the start/end bits indicate that more text characters in the phrase remain to be displayed may be used by the display device to delay for a period of time (e.g., 3–5 seconds) replacing the sub-phrase of 20 text symbols presently being displayed with the next sub-phrase of 20 text symbols.

Figure 5:
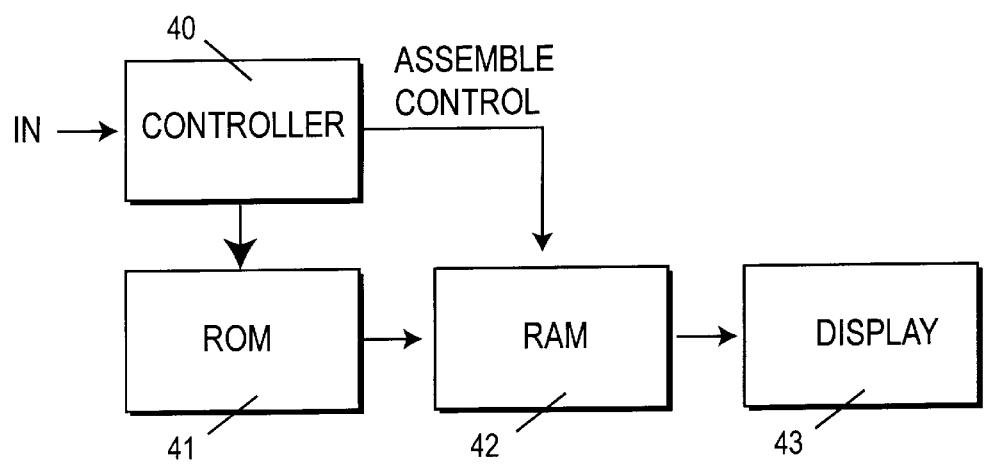
FIG. 5 is a block diagram representing the manner in which text characters are downloaded, assembled and displayed as phrases.

The manner in which a phrase of text symbols is displayed now will be described in conjunction with the block diagram shown in FIG. 5. Let it be assumed that the segments of audio and text data previously recorded on disc 20 (as shown in FIG. 2) are played back by a CD player. Let it be further assumed that this CD player includes a controller 40, ROM 41, RAM 42 and display 43 as shown in FIG. 5. While a typical CD player includes controller 40, the software used to program the controller may have to be modified in an obvious, straightforward manner in order to implement the present invention. Since such a modification is relatively simple, there is no need to provide herein a detailed description thereof.

As input data read from disc 20 is supplied to controller 40, the differences in the frame sync data "SYNC" recorded in the audio frames and recorded in the text character frames are used by controller 40 to determine whether a reproduced frame is an audio frame or a text character frame. When the frame sync data "SYNC" included in a text character frame is read by controller 40, each text character included in that frame is analyzed. The symbol identifying bits included in successive text characters are used to address the appropriate locations in ROM 41 to read out therefrom the corresponding text symbol. Each text symbol is loaded into RAM 42 whereat it is temporarily stored in the same order as its corresponding text character was read from the disc. Thus, successive text symbols are assembled in RAM 42 into a phrase. The first text symbol in the phrase is identified by the start/end bits "01" included in the corresponding text character; and when controller 40 senses the start/end bits "10" which indicate the last text symbol of the phrase, the temporarily stored symbols are read from RAM 42 by an assemble control signal supplied thereto by controller 40. The thus assembled phrase of text symbols is supplied to display 43 whereat the phrase is displayed for the user.

Thus, as disc 20 is played by the disc player, the groups of text characters stored as the text character frames are downloaded from the disc, sensed by controller 40 and used to assemble in RAM 42 a phrase of text symbols. Such assembling of text symbols occurs as the disc is being played; and when a phrase of text symbols has been assembled, it is read out and displayed so that the user may sing the song then being played back from the disc.

In the embodiment of the invention thus far described, it will be appreciated that a text character frame is inserted into a block of audio frames so that as the audio data is reproduced, the text data also is reproduced. Hence, text data that is associated with the audio data is reproduced in "real time" along with the audio data. Preferably, the text character frame is located on disc 20 and, thus, in the block of audio frames, in advance of those audio frames with which the text character frame is associated. This permits the text symbols to be displayed before the corresponding portion of the song is reproduced.

In the foregoing description, text character frames are distinguished from audio frames by the particular data pattern used as the frame sync data "SYNC". It will be appreciated, however, that the text character frames may be distinguished from the audio frames by the particular content of the sync control data "C". As mentioned above, bits P, Q, R, S, T, U, V and W constitute the sync control data C; and presently, only bit Q is used. The other bits included in the sync control data C serve no presently useful purpose. Accordingly, to distinguish a text character frame from an audio frame, one of these other bits may be used. For instance, bit R may be a "0" to identify an audio frame and may be a "1" to identify a text character frame. It will be appreciated that other bits or combinations of bits in the sync control data C may be used for this purpose.

Figure 6A:
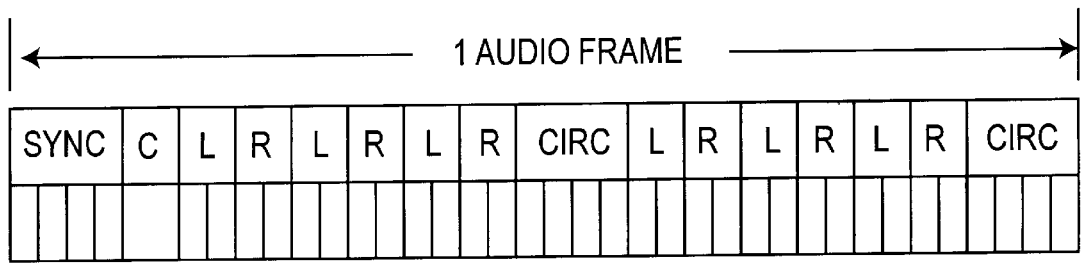
FIGS. 6A–6C schematically represent the manner in which the sync control data C in the respective frames of an audio block is used as the text character.
Figure 6B:
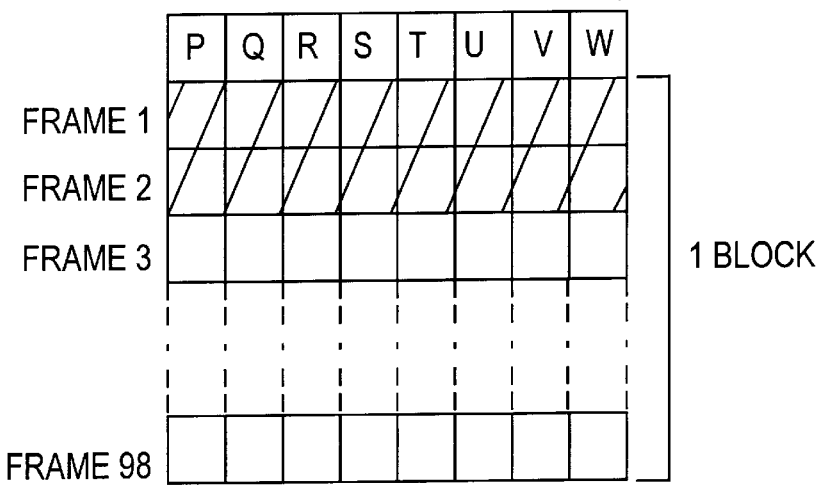
Figure 6C:

In the foregoing embodiment, one frame of audio data is replaced by a text character frame. This permits twenty-four text symbols to be stored in a single text character frame. This embodiment also calls for distinguishing between text character frames and audio frames so that all of the information included in a text character frame may be used to display a phrase of text symbols. In another embodiment, now to be described, the information representing text symbols is distributed throughout the sync control data C in the audio frames which constitute a block. This distribution of text data is schematically illustrated in FIGS. 6A–6C. It will be seen that the audio frame shown in FIG. 6A is of the very same structure as the audio frame shown in FIG. 1. However, the content of the sync control data C from frame to frame is different in the embodiment of FIG. 6A. This differing sync control data is depicted in FIGS. 6B and 6C, wherein FIG. 6B illustrates the sync control data included in a block of audio frames and FIG. 6C represents a typical sync control byte.

As discussed above, the sync control byte is formed of bits P–W. Presently, bit Q is dedicated for particular use by a typical CD player, namely to indicate the beginning of a block of audio frames. Hence, for the purpose of the present invention, bit Q is not used. Nevertheless, bits P, R, S, T, U, V and W remain available. But, to avoid interference with the usual operation of a CD player, since bit Q is used in audio frame #1 and audio frame #2 in a block of audio frames, it is preferable not to use any of available bits P, R, S, T, U, V and W in audio frame #1 or audio frame #2. The hatching in FIG. 6B illustrates that the sync control data C in audio frame #1 and in audio frame #2 is not used to represent text symbols. However, and consistent with this embodiment of the present invention, the sync control data C in audio frame #3, audio frame #4, . . . audio frame #98 in a block of audio frames is used to represent text symbols, as will now be described.

Since the sync control data in 96 out of 98 frames in a block of audio data is used to represent text symbols, it is appreciated that one block of audio frames thus may be used to store 96 different characters. As mentioned above, it is assumed that a phrase contains a maximum of 40 characters and, thus, by using the sync control data C, a block of audio frames is more than sufficient to store a complete phrase of characters.

Bits P and R are used as the aforedescribed start/end bits and, as assumed previously, the first text character in a phrase may be represented as "01", the last text character in a phrase may be represented as "10", an intermediary text character in a phrase may be represented as "00" and a space between adjacent words may be represented as "11". Bits S, T, U, V and W constitute the aforedescribed symbol identifying bits; and if these bits are used as address bits to address the ROM in which all possible text symbols are stored, it is appreciated that these five bits S, T, U, V and W may represent thirty-two different addresses. It is anticipated that no more than thirty-two symbols (including letters, a space and other graphical symbols) are more than sufficient to display all of the text symbols that a user may need, especially in the environment of karaoke.

Figure 7:
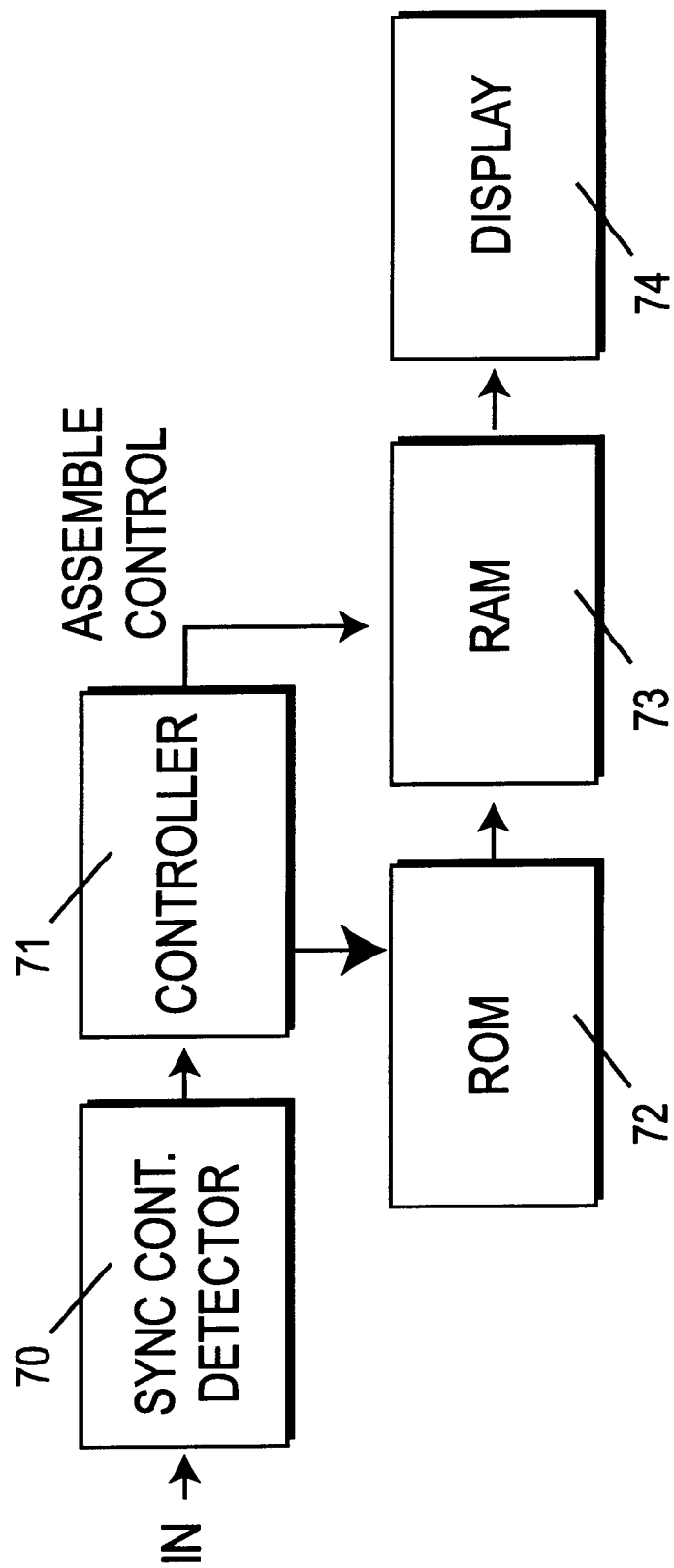
FIG. 7 is a block diagram representing another embodiment of apparatus for downloading, assembling and displaying text characters encoded as the sync control data shown in FIGS. 6A–6C.

The manner in which text symbols which are recorded as text characters in the sync control data C are sensed and displayed now will be described in conjunction with the block diagram shown in FIG. 7. It is assumed that the typical disc player is modified to include a sync control data detector 70, a ROM 72, a RAM 73 and a display device 74. It is further assumed that the usual controller in the disc player is programmed so as to operate as controller 71. Such controller may, of course, be a commercially available microprocessor.

As audio frames are reproduced from the disc, the audio frame data (FIG. 6A) is supplied to sync control detector 70 which operates to detect sync control data C in each frame. As assumed herein, the sync control data included in frame #1 and in frame #2 is ignored by detector 70; but the sync control data included in each of frames 3–98 is detected and supplied to controller 71. Bits S, T, U, V and W of each sync control byte included in frames 3–98 are used by controller 71 to address ROM 72 and read therefrom the text symbol data stored at the addressed location. Such text symbol data is transferred to RAM 73 whereat a phrase of text symbols is assembled. When the last text symbol in the phrase is loaded into RAM 73, as represented by "10" of the start/end bits P and R, controller 71 supplies a read out signal to the RAM so as to transfer to display 74 the assembled phrase. Thus, it is seen that the manner in which text symbols are read from ROM 72, temporarily stored in RAM 73 for assembly into a phrase and then displayed by display 74 is substantially the same as the manner in which the text symbols are assembled and displayed by the embodiment shown in FIG. 5. In the FIG. 7 embodiment, however, the text characters are represented by the sync control data C in a block of audio frames. Thus, whereas the embodiment of FIG. 5 operates by distinguishing text character frames from audio frames, the embodiment of FIG. 7 operates on the audio frames themselves, thus obviating the need to record separate text character frames.

In the embodiments described heretofore, the groups of text character data are stored on the very same recording disc as the audio data. The disc player with which the recording disc is used clearly is capable of reproducing the audio data even if that player is not adapted to detect and display the text symbols discussed herein. Thus, a disc on which both audio and text information are recorded may be played by a conventional disc player, even though the advantages of displaying text might not be exploited. Of course, if the controller included in the disc player is modified in the manner discussed above so as to sense text characters and assemble text symbols therefrom, the advantages of the present invention may be readily enjoyed. That is, text symbols associated with the recorded audio data may be displayed. In accordance with yet another aspect of the present invention, the text information may be recorded on a storage medium that is separate and apart from the recording disc on which the audio data is stored. In one embodiment, such separate storage medium may constitute a "special" compact disc (CD) or mini-disc (MD) which may be played on the same disc player as the conventional CD or MD, subject of course, to a modification of the controller included in that disc player in order to permit the text information stored on the "special" disc to be sensed and displayed. As an alternative embodiment, the separate storage medium on which the text characters are stored may be a storage cartridge which contains a memory board on which the text characters are stored. Both of these embodiments are described below.

Figure 3:
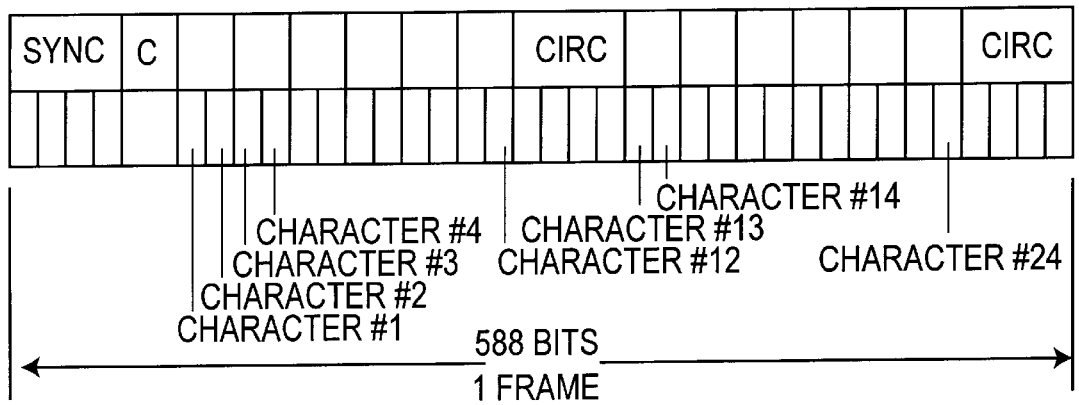
FIG. 3 is a schematic representation of a frame formed of text characters, consistent with the format by which audio information is recorded on a CD.
Figure 8A:
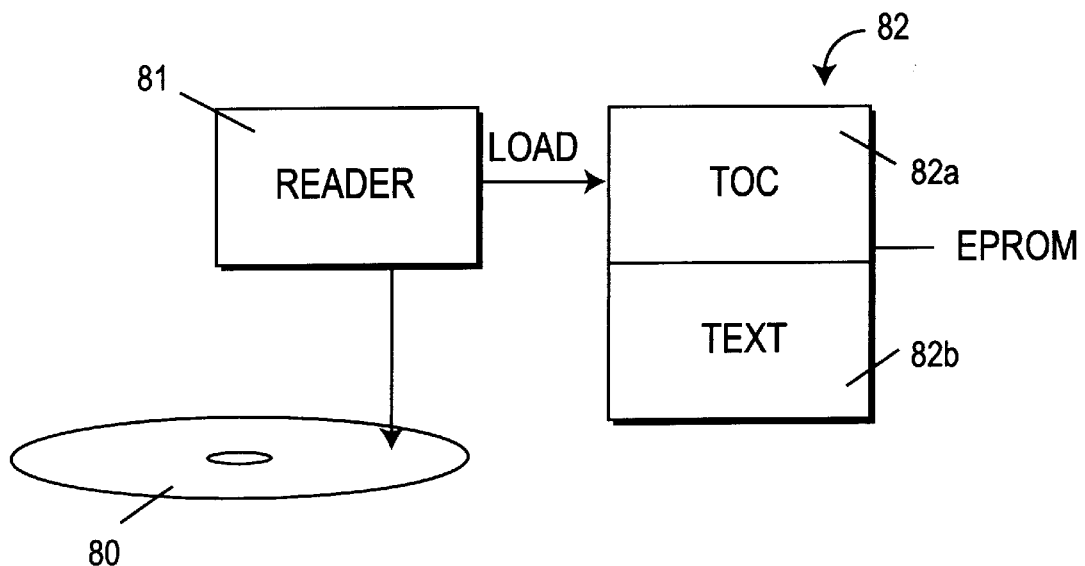
FIGS. 8A–8C represent the manner in which the present invention is used to download and display text symbols stored on a disc that is separate and apart from the disc on which the audio information is stored.

FIG. 8A is a block diagram representing the use of a disc player to reproduce from a "special" disc 80, such as a special CD, text data stored in the format shown in, for example, FIG. 3. It will be appreciated that the special disc 80 stores only text data and does not store any audio data. In addition to storing blocks of text character frames, special disc 80 also stores table of content (TOC) data, which represents the location on disc 80 at which the text character frames are located. In the environment of karaoke, the lyrics of a number of songs are recorded as the text character frames on special disc 80. Each song is associated with its own set of lyrics. The TOC data recorded on disc 80 identifies the location of the first text character frame of the lyrics associated with a particular song. For example, if the lyrics of eight songs are recorded on special disc 80, the TOC data identifies the location at which the lyrics of song #1 begin, the location at which the lyrics of song #2 begin, and so on.

Figure 8B:
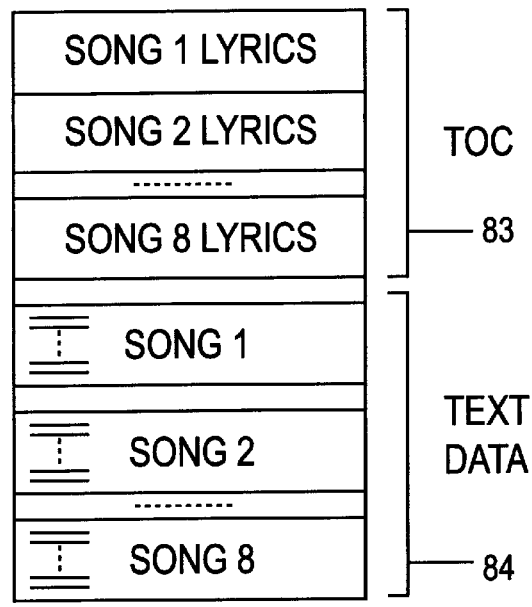

A reader 81 reads the information stored on special disc 80 and loads this information into an electronically programmable read only memory (EPROM) 82 that includes a TOC section 82a and a text section 82b. Thus, the TOC data read from special disc 80 is stored in TOC section 82a and the text characters having the construction shown in FIG. 4 are stored in text section 82b. A schematic representation of the contents of EPROM 82 is illustrated in FIG. 8B. It is seen that TOC data 83 is stored in TOC section 82a and identifies the addresses in text section 82b at which the lyrics of song #1 begin, the lyrics of song #2 begin, the lyrics of song #3 begin, . . . and the lyrics of song #8 begin. Text section 82b of EPROM 82 is depicted in FIG. 8B as containing text data 84, namely all of the lyrics of song #1, all of the lyrics of song #2, . . . and all of the lyrics of song #8. These lyrics are, of course, represented as text characters having the construction shown in FIG. 4.

Once the text characters are loaded into EPROM 82, they are available to be read out and displayed when an audio CD containing the songs corresponding to the lyrics that had been prerecorded on the special disc 80 is played. For example, an audio CD and its corresponding special CD may be sold as a "two-set" album. Alternatively, the special (or "lyrics") CD and the audio CD may be sold separately with appropriate informative materials in each to identify the proper audio CD that may be used with a particular lyrics CD, and vice versa.

Let it be assumed that audio CD 86 is played by the same player that was used to download the text characters from the special CD 80. Let it be further assumed that, in order to implement the karaoke function described herein, the audio CD 86 has recorded thereon TOC addressing data and phrase advance data. The TOC addressing data recorded on the audio CD may be the very same TOC addressing data normally recorded thereon and conventionally used to address the TOC data which is provided on the audio CD. It is expected that such normal TOC addressing data will identify not only the TOC data stored on audio CD 86 but also will address the TOC section 82a in which is stored the lyrics TOC data. Thus, when audio song #1 is addressed from the audio TOC data, song #1 is addressed from TOC section 82a. Likewise, if the user selects song #4 to be played from audio CD 86, the TOC addressing data conventionally used to address song #4 from the audio disc will be used to address song #4 from TOC section 82a of EPROM 82. Consequently, as audio disc 86 is played, reader 81 reads not only the audio data therefrom but also the TOC addressing data. Now, when the user plays song #4, the TOC addressing data which identifies the storage location on audio disc 86 for song #4 also addresses TOC section 82a of EPROM 82 to read therefrom the data which identifies in text section 82b the location at which the first text character of song #4 is stored. This first text character, as well as successive characters representing the lyrics of song #4 are read from text section 82b of EPROM 82 and are loaded into RAM 87. Thus, a phrase of text symbols is assembled in the RAM; and when the phrase advance signal is read from audio CD 86, the assembled phrase of text symbols is supplied to display 88 and the next phrase of text symbols is read from text section 82b for assembly in RAM 87. Hence, as the playback of audio CD 86 proceeds, phrases of text symbols are assembled in RAM 87 and, at the appropriate time, read out to display 88. Therefore, the user may observe the lyrics as the audio CD is played; and he may sing along with the accompaniment then being played back.

When the user wishes to play another song previously recorded on audio CD 86, the TOC data which identifies the beginning of that song also is used to identify the location in TOC section 82a of EPROM 82 which represents the beginning of the lyrics that previously had been downloaded from special CD 80 and that are associated with that song. Such lyrics are stored in text section 82b as the text characters shown in FIG. 4; and as the reproduction of this particular song proceeds, the phrase of text symbols representing the lyrics for that song are read from text section 82b of EPROM 82, temporarily stored for assembly in RAM 87 and periodically read out to display 88.

It will be appreciated that text section 82b of EPROM 82, RAM 87 and display 88 function in substantially the same manner as ROM 41, RAM 42 and display 43 previously described in conjunction with FIG. 5. If the amount of data recorded on special CD 80 is larger than the capacity of EPROM 82, it is contemplated that conventional compression techniques may be used to record the text characters in order to reduce the capacity otherwise required by the EPROM.

In the embodiment just described, it is assumed that the TOC data normally recovered from audio CD 86 is used to address TOC section 82a of EPROM 82 in order to read therefrom the data which identifies the location in text section 82b at which the lyrics of the song begins. Alternatively, one or more of the unused bits of the sync control data C recorded on the audio CD, such as one or more of bits P, R, S, T, U, V and W (FIG. 6C) may be used as the TOC addressing data to address TOC section 82a when the beginning of a desired song is reproduced from audio CD 86. Also, TOC section 82a may store more than simply the location in text section 82b at which the beginning of the lyrics of a particular song is stored. For example, TOC section 82a may store the address of the first frame in each block that is stored in text section 82b.

Figure 8C:
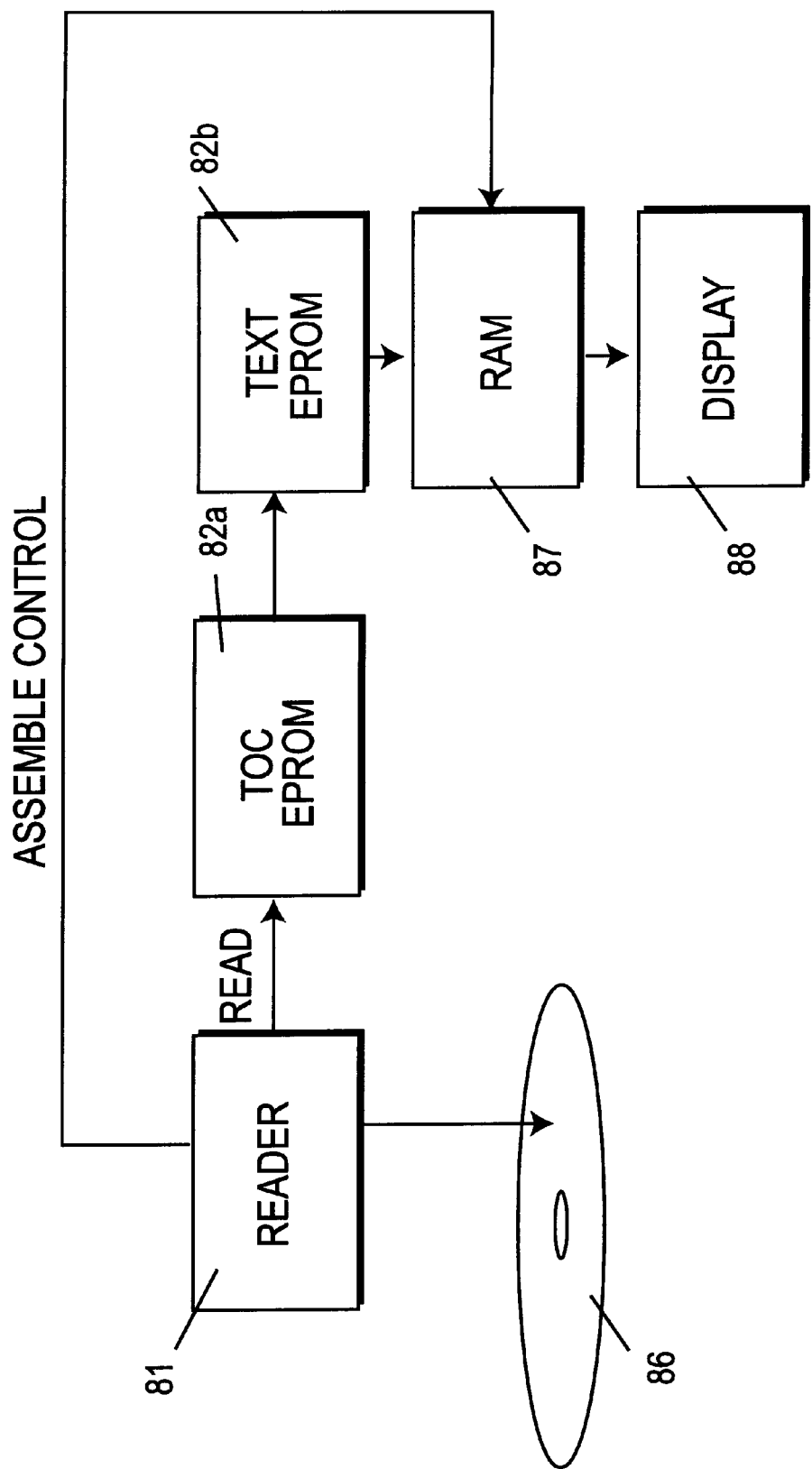

In the embodiment just described, a special CD is used to load into EPROM 82 the text characters which are used to display the lyrics of those songs that are recorded on companion audio disc 86. In an alternative embodiment, the audio CD player may be adapted for displaying such lyrics that may be stored as text characters in a memory cartridge. In that event, the memory cartridge contains EPROM 82 which, of course, is "preloaded" with the TOC address data in TOC section 82a and the text characters in text section 82b. Hence, there is no need to download from a special disc 80 the text characters to be stored in the text section. It is contemplated that a commercial implementation of this text display feature will sell or distribute audio CDs together with memory cartridges. To carry out the karaoke feature, the user simply inserts the memory cartridge into his CD player at the same time that he inserts audio CD 86; and as shown in FIG. 8C, the text characters stored in the EPROM are used to assemble text symbols in RAM 87 which are periodically read out to display 88.

While the present invention has been particularly shown and described with reference to certain preferred embodiments thereof, it will be readily appreciated by those of ordinary skill in the art that various changes and modifications may be made without departing from the spirit and scope of the invention. It is intended that the appended claims be interpreted as including not only the specific embodiments described above but also those equivalents thereto.

What is claimed is:

1. A method of displaying text symbols associated with audio data that has been recorded on and is reproducible from a recording disc, comprising the steps of:

downloading previously stored groups of text characters, each group representing a respective phrase of text and each text character including start/end bits and symbol identifying bits, the start/end bits designating said each text character as one of at least a start, an intermediary character, a space between characters, and an end of the respective phrase and the symbol identifying bits identifying a respective text symbol for display;

assembling a phrase of text symbols in response to the start/end bits and the symbol identifying bits of a downloaded group of text characters; and displaying the assembled phrase of text symbols.

2. The method of claim 1 wherein said displayed text symbols are karaoke symbols.

3. The method of claim 1 wherein the step of assembling a phrase of text symbols comprises storing in a read only memory (ROM) each text symbol to be displayed; using the symbol identifying bits of each downloaded text character to address said ROM and read therefrom the stored text symbol corresponding to said symbol identifying bits; and temporarily storing the read text symbol.

4. The method of claim 3 wherein said groups of text characters are stored on the same recording disc as is stored said audio data.

5. The method of claim 4 wherein said audio data is stored in blocks of frames, with each frame exhibiting a format that includes frame sync data, sync control data, audio data and error correcting data; and wherein said text characters are stored as one frame in a block in place of said audio data that otherwise would be stored in said one frame.

6. The method of claim 5 wherein said frame sync data of said one frame in which text characters are stored differs from the frame sync data of those frames in which said audio data is stored.

7. The method of claim 5 wherein said sync control data of said one frame in which text characters are stored differs from the sync control data of those frames in which said audio data is stored.

8. The method of claim 5 wherein the frame in which said text characters are stored is provided on said recording disc in advance of those frames in which said associated audio data is stored.

9. The method of claim 4 wherein said audio data is stored in blocks of frames, with each frame exhibiting a format that includes frame sync data, sync control data, audio data and error correcting data; and wherein said text characters are distributed throughout said sync control data in a block.

10. The method of claim 9 wherein said sync control data includes pre-assigned bits and said text characters are represented by bits other than said pre-assigned bits.

11. The method of claim 3 wherein said groups of text characters are stored on a storage medium which is different from the recording disc on which said audio data is stored.

12. The method of claim 11 wherein said text characters are stored in frames with each frame exhibiting a format that includes frame sync data, sync control data, said text characters and error correcting data; and wherein the downloaded text characters are downloaded from said storage medium.

13. The method of claim 12 further comprising the step of reading from a recording disc on which said audio data is stored a signal to advance the display from one assembled phrase of text symbols to another assembled phrase of text symbols.

14. The method of claim 11 wherein said storage medium comprises a circuit board having a memory and said text characters are stored in said memory; and wherein the downloaded text characters are downloaded from said memory on said circuit board.

15. The method of claim 14 further comprising the step of reading from a recording disc on which said audio data is stored a signal to advance the display from one assembled phrase of text symbols to another assembled phrase of text symbols.

16. Apparatus for displaying text symbols that are associated with audio data that has been pre-recorded on a recording disc, said text symbols being stored as text characters on a record medium, comprising:

a reproducer for recovering groups of said text characters from said record medium, each group representing a respective phrase of text and each text character including position bits and symbol identifying bits the position bits designating said each text character as one of at least a start, an intermediary character a space between characters and an end of the respective phrase and the symbol identifying bits identifying a respective text symbol for display;

an assembler for assembling a phrase of text symbols in response to said position and symbol identifying bits of a recovered group of text characters; and a display for displaying the assembled phrase of text symbols.

17. The apparatus of claim 16 wherein the displayed text symbols are karaoke symbols.

18. The apparatus of claim 16 wherein said assembler comprises a read only memory (ROM) for storing at addressable locations all of the text symbols to be displayed; an addresser for using the symbol identifying bits of a recovered text character to select a location in said ROM from which the text symbol stored thereat is read; and a RAM for accumulating and temporarily storing the text symbols read from said ROM.

19. The apparatus of claim 18 wherein said RAM accumulates a phrase of text symbols.

20. The apparatus of claim 18 wherein said groups of text characters are stored on and recovered from the same recording disc as the audio data.

21. The apparatus of claim 20 wherein said audio data is stored in blocks of frames, with each frame exhibiting a format that includes frame sync data, sync control data, audio data and error correcting data; and wherein said text characters are stored as one frame in a block in place of said audio data that otherwise would be stored in said one frame.

22. The apparatus of claim 21 wherein said frame sync data of said one frame in which text characters are stored differs from the frame sync data of those frames in which said audio data is stored.

23. The apparatus of claim 21 wherein said sync control data of said one frame in which text characters are stored differs from the sync control data of those frames in which said audio data is stored.

24. The apparatus of claim 21 wherein the frame in which said text characters are stored is provided on said recording disc in advance of those frames in which said associated audio data is stored.

25. The apparatus of claim 20 wherein said audio data is stored in blocks of frames, with each frame exhibiting a format that includes frame sync data, sync control data, audio data and error correcting data; and wherein said text characters are distributed throughout said sync control data in a block.

26. The apparatus of claim 25 wherein said sync control data includes pre-assigned bits and said text characters are represented by bits that differ from said pre-assigned bits.

27. The apparatus of claim 18 wherein said groups of text characters are stored on and recovered from a storage medium which is different from the recording disc on which the audio data is stored.

28. The apparatus of claim 27 wherein said text characters are stored in a frames with each frame exhibiting a format that includes frame sync data, sync control data, said text characters and error correcting data; and wherein the downloaded text characters are downloaded from said storage medium.

29. The apparatus of claim 28 wherein said RAM stores plural phrases; wherein the recording disc on which the audio data is stored also stores a phrase advance signal; and wherein a reader is provided for reading said audio data and said phrase advance signal from the recording disc on which the audio data is stored; said apparatus further comprising means responsive to said phrase advance signal to transfer to said display a succeeding phrase of text symbols stored in said RAM.

30. The apparatus of claim 27 wherein said storage medium comprises a circuit board having a memory and said text characters are stored in frames in said memory; and wherein the recovered text characters are reproduced from said memory on said circuit board.

31. The apparatus of claim 30 wherein said RAM stores plural phrases; wherein the recording disc on which the audio data is stored also stores a phrase advance signal; and wherein a reader is provided for reading said audio data and said phrase advance signal from the recording disc on which the audio data is stored; said apparatus further comprising means responsive to said phrase advance signal to transfer to said display a succeeding phrase of text symbols stored in said RAM.

* * * * *